(12) United States Patent
Suzuki et al.

(10) Patent No.: US 12,460,570 B2
(45) Date of Patent: Nov. 4, 2025

(54) EXHAUST GAS PIPE, AND ENGINE

(71) Applicant: MITSUBISHI HEAVY INDUSTRIES ENGINE & TURBOCHARGER, LTD., Sagamihara (JP)

(72) Inventors: Hajime Suzuki, Sagamihara (JP); Minoru Esaki, Sagamihara (JP); Takeshi Kadowaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 166 days.

(21) Appl. No.: 18/273,500

(22) PCT Filed: Dec. 2, 2021

(86) PCT No.: PCT/JP2021/044326
§ 371 (c)(1),
(2) Date: Aug. 31, 2023

(87) PCT Pub. No.: WO2022/158136
PCT Pub. Date: Jul. 28, 2022

(65) Prior Publication Data
US 2024/0093628 A1    Mar. 21, 2024

(30) Foreign Application Priority Data
Jan. 25, 2021    (JP) .................. 2021-009890

(51) Int. Cl.
*F01N 13/18*    (2010.01)
*F16L 23/032*    (2006.01)
*F16L 27/053*    (2006.01)

(52) U.S. Cl.
CPC ........ *F01N 13/1827* (2013.01); *F16L 23/032* (2013.01); *F16L 27/053* (2013.01)

(58) Field of Classification Search
CPC .... F16L 27/053; F16L 23/032; F01N 13/1827
See application file for complete search history.

(56) References Cited

U.S. PATENT DOCUMENTS 432,318 A * 7/1890 Mathews et al. ..... F16L 23/032
285/368
3,561,793 A * 2/1971 Rode ..................... F16L 17/067
285/422
(Continued)

FOREIGN PATENT DOCUMENTS

JP    61-51431 U    4/1986
JP    01207134 A *    8/1989    ............ F16L 27/053
(Continued)

OTHER PUBLICATIONS

International Search Report dated Feb. 1, 2022 for Application No. PCT/JP2021/044326 with an English translation.
(Continued)

*Primary Examiner* — Eugene G Byrd
(74) *Attorney, Agent, or Firm* — Birch, Stewart, Kolasch & Birch, LLP

(57) ABSTRACT

An exhaust gas pipe includes: a plurality of pipe bodies which are formed in a tubular shape centered on an axis and are arranged in a direction of the axis and through which an exhaust gas led from an engine body flows; a connection portion which connects a pair of the pipe bodies adjacent to each other; and a gasket which is provided between the pipe body and the connection portion, wherein a flange projecting toward an outer peripheral side is provided a an end portion of the pipe body in the direction of the axis, wherein the connection portion includes a main connection body which has a tubular shape centered on the axis and a pressing ring which is provided with a facing surface facing the flange while sandwiching the gasket in a gap between the flange and the facing surface, and wherein the exhaust gas pipe
(Continued)

further includes: coupling members which are provided at intervals in a circumferential direction and couple the flange and the pressing ring to each other; and a deformation prevention member that is provided in an outer peripheral region of the gap.

7 Claims, 4 Drawing Sheets

(56) References Cited

U.S. PATENT DOCUMENTS

| | | | | |
|---|---|---|---|---|
| 3,794,363 | A * | 2/1974 | Schulz | F16L 23/032 403/336 |
| 3,923,326 | A * | 12/1975 | Mez | F16L 23/032 285/424 |
| 4,000,921 | A * | 1/1977 | Daspit | F16L 23/02 285/368 |
| 4,186,949 | A * | 2/1980 | Bartha | F16L 27/108 285/229 |
| 4,484,771 | A * | 11/1984 | Schulz | F16L 23/0283 285/368 |
| 4,558,892 | A * | 12/1985 | Daw | F16L 23/14 285/424 |
| 4,616,860 | A * | 10/1986 | Faria | F16J 15/0881 285/368 |
| 4,620,732 | A * | 11/1986 | Marshall | F16L 23/032 285/368 |
| 4,696,494 | A * | 9/1987 | Schmitz | F16L 27/053 285/31 |
| 4,756,561 | A * | 7/1988 | Kawata | F16J 15/164 277/606 |
| 5,054,793 | A * | 10/1991 | Hauenstein | F01N 13/1827 277/593 |
| 5,159,811 | A * | 11/1992 | Hefler | F16L 27/11 60/322 |
| 2006/0162326 | A1* | 7/2006 | Nakagawa | F01N 13/1827 60/322 |
| 2011/0120085 | A1* | 5/2011 | Saito | F01N 13/1855 60/272 |
| 2017/0022875 | A1* | 1/2017 | Jang | F01N 3/103 |
| 2018/0087434 | A1 | 3/2018 | Gidla | |
| 2019/0145558 | A1* | 5/2019 | Cowham | F01N 13/1805 285/421 |
| 2020/0318762 | A1* | 10/2020 | Dong | F16L 23/18 |

FOREIGN PATENT DOCUMENTS

| | | | | |
|---|---|---|---|---|
| JP | H0550280 U | * | 12/1991 | |
| JP | 5-502929 A | | 5/1993 | |
| JP | 5-50280 U | | 7/1993 | |
| JP | 2003-286842 A | | 10/2003 | |
| JP | 2007162800 A | * | 6/2007 | |
| JP | 2019120192 A | * | 7/2019 | F01N 13/08 |
| WO | WO 92/01887 A1 | | 2/1992 | |

OTHER PUBLICATIONS

Written Opinion of the International Searching Authority dated Feb. 1, 2022 for Application No. PCT/JP2021/044326 with an English translation.

* cited by examiner

EXHAUST GAS PIPE, AND ENGINE

TECHNICAL FIELD

The present disclosure relates to an exhaust gas pipe and an engine.

Priority is claimed on Japanese Patent Application No. 2021-009890, filed Jan. 25, 2021, the content of which is incorporated herein by reference.

BACKGROUND ART

A diesel or gas engine includes an engine body which is provided with a plurality of combustion chambers accommodating pistons, an exhaust gas pipe which guides an exhaust gas generated in the engine body to an external device such as a turbocharger, and a branch pipe. Each combustion chamber is connected to the exhaust gas pipe through the branch pipe. That is, the combined exhaust gas from each branch pipe flows through the exhaust gas pipe. The exhaust gas pipe has a tubular shape centered on the axis and the branch pipes are connected to intermediate positions in the axial direction.

Here, the temperature of the exhaust gas reaches about 500° C. while the engine is running. Due to the thermal stress of the exhaust gas, the exhaust gas pipe may be thermally deformed in the axial direction. In order to absorb such thermal deformation, for example, a technique described in Patent Document 1 below is used. In Patent Document 1 below, an elastic pipe that can be expanded and contracted in the axial direction is provided between a plurality of main exhaust pipes arranged in the axial direction. It is said that the influence of the thermal deformation can be avoided by expanding and contracting the elastic pipe according to the thermal deformation of the main exhaust pipe.

The main exhaust pipe and the elastic pipe described above are generally connected to each other by a flange as shown in Patent Document 2 below. Specifically, the end portion of the main exhaust pipe is provided with a flange that spreads outward. The end portion of the elastic pipe is sandwiched between the flange and a ring-shaped member. The ring-shaped member and the flange are coupled by bolts and nuts. Further, such a connection portion is provided with a gasket to seal the leakage of the exhaust gas. The gasket is sandwiched between the ring-shaped member and the flange.

CITATION LIST

Patent Document(s)

Patent Document 1: Japanese Unexamined Patent Application, First Publication No. 2003-286842
Patent Document 2: Japanese Unexamined Utility Model Application, First Publication No. S61-51431

SUMMARY OF INVENTION

Technical Problem

Here, it is necessary to replace the gasket periodically as the engine ages. At this time, the flange may be deformed due to thermal stress. Therefore, even if the bolt is tightened with a specified torque, there is a possibility that an appropriate surface pressure cannot be secured between the flange and the ring-shaped member. As a result, the sealing performance between the main exhaust pipe and the elastic pipe is degraded.

The present disclosure has been made to solve the above-described problems and an object thereof is to provide an exhaust gas pipe and an engine in which leakage of an exhaust gas is further reduced.

Solution to Problem

In order to solve the above described problems, an exhaust gas pipe according to the present disclosure includes: a plurality of pipe bodies which are formed in a tubular shape centered on an axis and are arranged in a direction of the axis and through which an exhaust gas led from an engine body flows; a connection portion connecting a pair of the pipe bodies adjacent to each other in the direction of the axis; and a gasket which is provided between the pipe body and the connection portion, wherein a flange projecting toward an outer peripheral side is provided at an end portion of the pipe body in the direction of the axis, wherein the connection portion includes a main connection body which has a tubular shape centered on the axis and a pressing ring which is provided with a facing surface facing the flange while sandwiching the gasket in a gap between the flange and the facing surface, and wherein the exhaust gas pipe further includes: coupling members which are provided at intervals in a circumferential direction and coupling the flange and the pressing ring to each other; and a deformation prevention member that is provided in an outer peripheral region of the gap.

Advantageous Effects of Invention

According to the present disclosure, it is possible to provide an exhaust gas pipe and an engine in which leakage of an exhaust gas is further reduced.

DESCRIPTION OF EMBODIMENTS

First Embodiment

Figure 1:
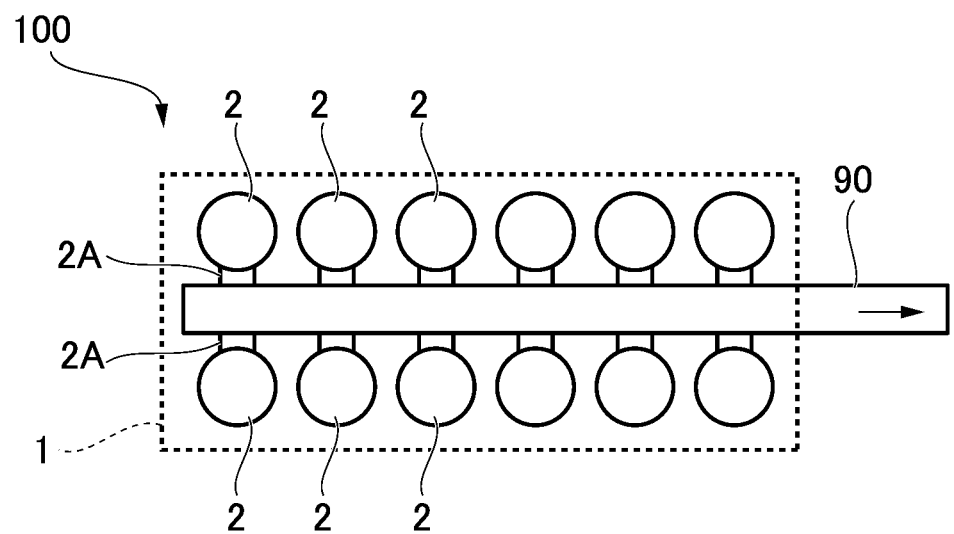
FIG. 1 is a schematic view showing a configuration of an engine according to a first embodiment of the present disclosure.

Hereinafter, an engine 100 and an exhaust gas pipe 90 according to a first embodiment of the present disclosure will be described with reference to FIGS. 1 to 4.
(Configuration of Engine)

The engine 100 is, for example, a diesel engine or gas engine used as a power source for ships and power plants. The engine 100 includes an engine body 1, an exhaust gas pipe 90, and a branch pipe 2A. The engine body 1 is formed in a block shape and a plurality of (twelve as an example) combustion chambers 2 are formed therein. In this embodiment, six combustion chambers 2 are formed in two rows. Pistons (not shown) are accommodated in these combustion chambers 2.

For example, in the case of a diesel engine, the fuel supplied to the combustion chamber 2 is compressed by the forward and backward movement of the piston, and the fuel spontaneously ignites. The output shaft of the engine 100 is rotated by such operations continuously occurring in each combustion chamber 2 with different timings. Rotational energy of the output shaft is extracted from the end of the shaft and used for various purposes (for example, driving a propeller in the case of a ship and driving a generator in the case of a power plant).

In each combustion chamber 2, exhaust (exhaust gas) is generated as the fuel is burned. This exhaust is led to an external supercharger by the exhaust gas pipe 90. More specifically, one end of the branch pipe 2A through which an exhaust gas flows is connected to each combustion chamber 2. The other end of the branch pipe 2A is connected to the exhaust gas pipe 90. That is, a total of twelve branch pipes 2A are connected to the exhaust gas pipe 90. The exhaust gas pipe 90 extends along the direction in which the combustion chambers 2 are arranged.

(Configuration of Exhaust Gas Pipe)

Figure 2:
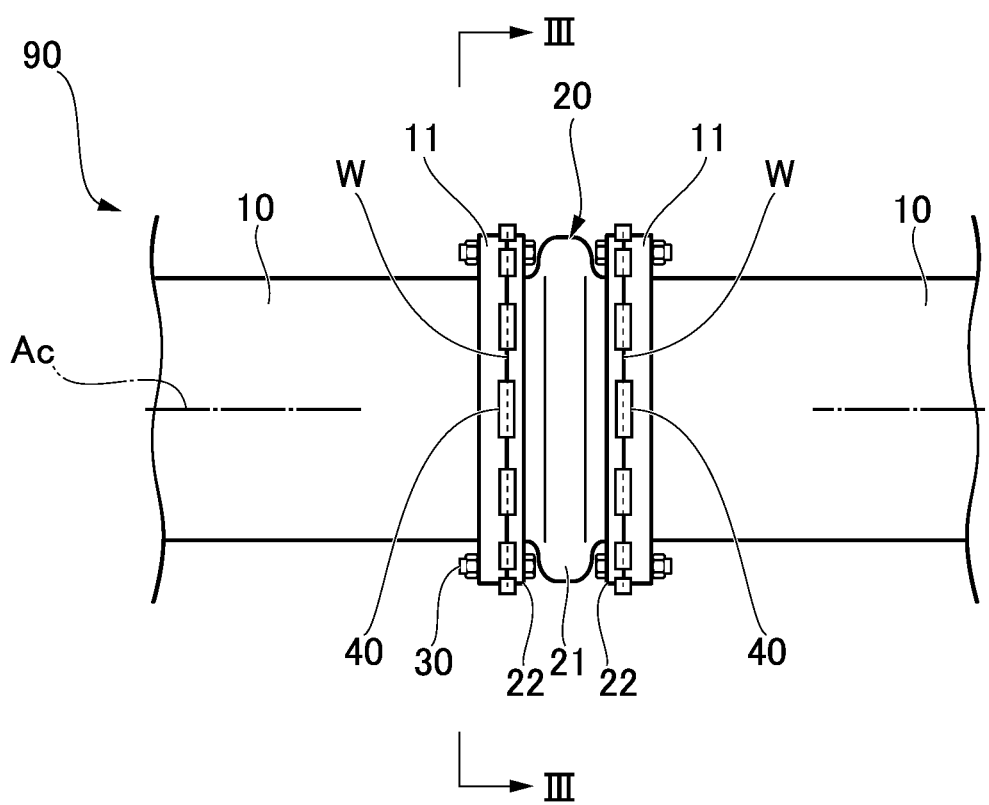
FIG. 2 is a side view of an exhaust gas pipe according to the first embodiment of the present disclosure.
Figure 3:
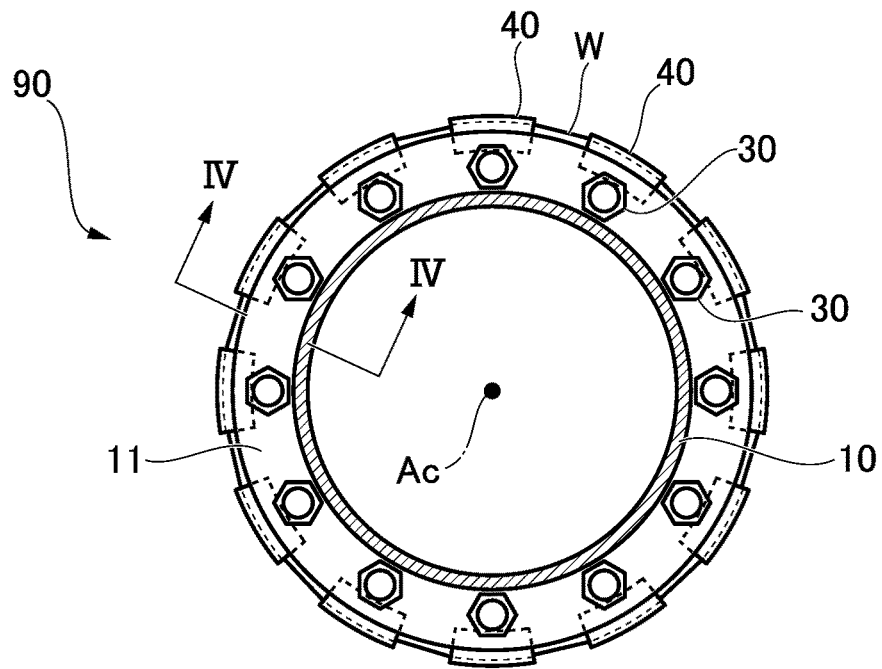
FIG. 3 is a cross-sectional view taken along a line III-III of FIG. 2.
Figure 4:
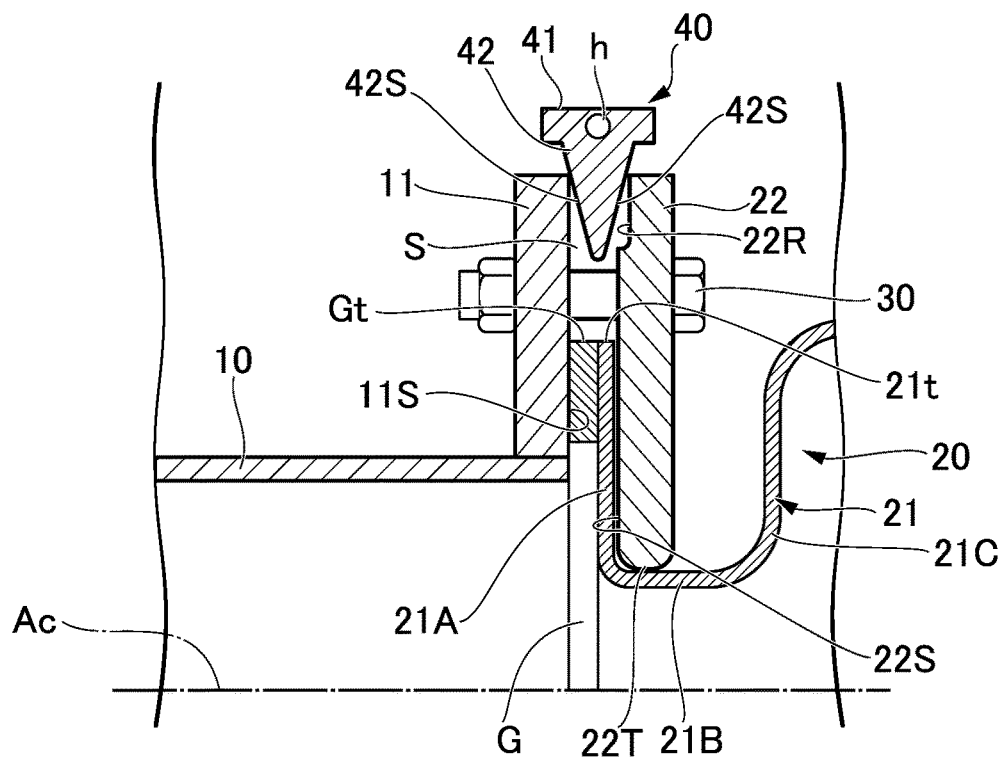
FIG. 4 is a cross-sectional view taken along a line IV-IV of FIG. 3.

Next, the configuration of the exhaust gas pipe 90 will be described with reference to FIGS. 2 to 4. As shown in FIG. 2 or 4, the exhaust gas pipe 90 includes a plurality of pipe bodies 10, a flange 11, a connection portion 20, a gasket G (see FIG. 4), a coupling member 30, and a deformation prevention member 40.

As shown in FIG. 2, the plurality of pipe bodies 10 are arranged at intervals in a direction of the axis Ac of the exhaust gas pipe 90. The pipe body 10 has a tubular shape centered on the axis Ac. As an example, the outer diameter dimension of the pipe body 10 is about 600 mm. Further, as shown in FIG. 4, the flange 11 is provided at the end portion of the pipe body 10 in the direction of the axis Ac. The flange 11 has an annular shape by projecting from the pipe body 10 toward the outer peripheral side. The flange 11 is coupled to the pipe body 10 by welding.

As shown in FIG. 2, the connection portion 20 connects the pair of pipe bodies 10 adjacent to each other. The connection portion 20 includes a main connection body 21 and a pressing ring 22. The main connection body 21 can be expanded and contracted in the direction of the axis Ac. Specifically, as shown in FIG. 4, the main connection body 21 includes a collar 21A, a parallel portion 21B, and an elastic portion 21C. The collar 21A is a portion sandwiched between the flange 11 and the pressing ring 22 which will be described later.

The collar 21A has an annular plate shape centered on the axis Ac. The parallel portion 21B has a tubular shape extending in the direction of the axis Ac from the inner peripheral edge of the collar 21A. The elastic portion 21C is connected to the edge of the parallel portion 21B on the side opposite to the collar 21A. The elastic portion 21C has a curved shape that expands in diameter toward the outer peripheral side in a cross-sectional view. When a force is applied to the elastic portion 21C from the direction of the axis Ac, the elastic portion 21C bends and the entire main connection body 21 expands and contracts.

The pressing ring 22 has an annular plate shape centered on the axis Ac. The inner peripheral edge (ring inner peripheral edge 22T) of the pressing ring 22 is located on the inner radial side of the inner peripheral edge of the flange 11 in the radial direction. Further, the ring inner peripheral edge 72T contacts the parallel portion 21B. The pressing ring 22 faces the surface of the flange 11 on one side in the direction of the axis Ac (flange facing surface 11S) with a gap S therebetween.

The surface of the pressing ring 22 facing the other side in the direction of the axis Ac (the surface facing the flange 11) is a facing surface 22S. That is, the gap S is surrounded by the flange facing surface 11S and the facing surface 22S from the direction of the axis Ac. The gasket G and the collar 21A are sandwiched in the gap S. Specifically, the gasket G is located on the other side in the direction of the axis Ac and the collar 21A is located on one side in the direction of the axis Ac in the gap S. The gasket G and the collar 21A are in close contact with each other. The gasket G has an annular plate shape centered on the axis Ac. For example, the gasket G is integrally made of SUS. Although not shown in detail, the gasket G is hollow and is configured to bend when pressed from both sides in the direction of the axis Ac.

An annular notch 22R which is recessed toward one side in the direction of the axis Ac and extends in the circumferential direction is formed in a region on the radial outside of a bolt (to be described later) of the facing surface 22S of the pressing ring 22. The notch 22R is provided to hold the deformation prevention member 40 to be described later.

The coupling member 30 couples the flange 11 and the pressing ring 22 while sandwiching the gasket G and the collar 21A in the gap S as described above. As shown in FIG. 3, a plurality of (twelve as an example) the coupling members 30 are provided at intervals in the circumferential direction. The coupling member 30 includes a bolt and a nut. That is, a hole through which a bolt is inserted is formed in the flange 11 and the pressing ring 22. The outer peripheral edge (collar edge 21t) of the collar 21A and the outer peripheral edge (gasket edge Gt) of the gasket G are located on the inner radial side of the bolt within the trap S. That is, an intermediate portion of the bolt is exposed in the gap S.

The deformation prevention member 40 is disposed in the gap S. The deformation prevention member 40 is provided to uniformly distribute the surface pressure in the radial direction between the flange 11 and the pressing ring 22. As shown in FIG. 3 or 4, the deformation prevention member 40 is inserted into the gap S from the outer peripheral side. Further, as shown in FIG. 3, a plurality of (twelve as an example) the deformation prevention members 40 are provided at intervals in the circumferential direction. The circumferential position of the deformation prevention member 40 coincides with the circumferential position of the coupling member 30. That is, one deformation prevention member 40 is provided on the outer peripheral side of one coupling member 30. As shown in FIG. 4, the deformation prevention member 40 includes a base portion 41 which is located on the outer peripheral side and a tapered portion 42 which extends from the base portion 41 toward the inner peripheral side.

The base portion 41 has a plate shape with an arcuate cross-sectional shape when viewed from the direction of the axis Ac. A through-hole h which extends in the circumferential direction is formed in the base portion 41. A wire W is inserted through the through-hole h. As shown in FIG. 3, the wire W is provided to hold the plurality of deformation prevention members 40 to prevent the detachment thereof. Again, as shown in FIG. 4, the tapered portion 42 is provided integrally with the inner radial end surface of the base portion 41, and the dimension in the direction of the axis Ac gradually decreases toward the inner radial side. That is, the tapered portion 42 has a triangular cross-sectional shape in a cross-sectional view including the axis Ac. The surfaces facing both sides of the tapered portion 42 in the direction of the axis Ac are tapered surfaces 42S. In a state in which the deformation prevention member 40 is inserted into the gap S, one tapered surface 42S comes into contact with the outer peripheral edge of the notch 22k and the other tapered surface 42S comes into contact with the outer peripheral edge of the flange facing surface 11S.

(Operation and Effect)

Next, the method of assembling the exhaust gas pipe 90 according to this embodiment and the behavior of the exhaust gas pipe 90 during the operation of the engine 100 will be described.

When assembling the exhaust gas pipe 90, first, the plurality of pipe bodies 10 are connected by the connection portion 20. Specifically, the gasket G and the collar 21A of the main connection body 21 are sandwiched between the flange 11 and the pressing ring 22. In this state, the flange 11 and the pressing ring 22 are fastened by bolts and nuts as the coupling member 30. The tightening torque of the bolt at this time is a predetermined specified value. In addition, when the bolt is tightened beyond this specified value, the flange 11 may be deformed to fall toward one side in the direction of the axis Ac with the joint (welded portion) with the pipe body 10 as a fulcrum. In other words, the specified value is appropriately determined within a range in which such deformation does not occur.

Next, the deformation prevention member 40 is inserted into the gap S from the outer peripheral side in the above-described state. Specifically, first, the plurality of deformation prevention members 40 through which the wires W are inserted are respectively arranged on the outer peripheral side of the gap S. Further, a striking force is applied to the base portion 41 of the deformation prevention member 40 with a hammer or the like so that the base portion is press-fitted into the gap S. Accordingly, the tapered surface 42S of the deformation prevention member 40 is in close contact with the flange 11 and the pressing ring 22 and cannot be removed. Finally, the wire W is tightened. Accordingly, the assembly of the exhaust gas pipe 90 is completed.

Next, the behavior of the exhaust gas pipe 90 during the operation of the engine 100 will be described. During the operation of the engine 100 an exhaust gas of about 500° C. is generated in the combustion chamber 2. This exhaust gas is sent to the exhaust gas pipe 90 through the branch pipe 2A. Due to the heat of the exhaust gas, the exhaust gas pipe 90 is thermally deformed in the direction of the axis Ac. This thermal deformation is absorbed by the elastic portion 21C of the connection portion 20 bending in the direction of the axis Ac as described above. Accordingly, the relative position of the exhaust gas pipe 90 and the branch pipe 2A is maintained and the engine 100 can continue to operate stably.

Here, when the sealing performance of the gasket G deteriorates with use over time, it is necessary to remove the bolt and nut as the coupling member 30, replace the gasket G, and fasten the bolt and nut again. At this time, the flange 11 itself may also be thermally deformed by the heat of the exhaust gas. Specifically, in some cases, the flange 11 is deformed to fall in the direction of the axis Ac with the joint of the flange 11 and the pipe body 10 as a fulcrum. That is, the dimension in the direction of the axis Ac in the outer peripheral region of the gap S may be smaller than the initial size. In this case, even if the bolt and nut are tightened with a specified torque, the tightening force is not sufficiently transmitted between the flange 11 and the pressing ring 22, and there is a possibility that the surface pressure against the gasket G cannot be secured.

Here, in this embodiment, the deformation prevention member 40 is provided in the gap S as described above. Specifically, the deformation prevention member 40 is provided in the outer peripheral region of the gap S formed between the flange 11 and the pressing ring 22. Since the deformation prevention member 40 is disposed in the gap S, the flange 11 and the pressing ring 22 are mechanically coupled in the outer peripheral region of the gap S. That is, when the flange 11 and the pressing ring 22 are tightened by the coupling member 30, a tightening force is transmitted between the flange 11 and the pressing ring 22 through the deformation prevention member 40. Thus, even when the flange 11 is deformed and inclined in the direction of the axis Ac, it is possible to secure the surface pressure against the gasket G between the flange 11 and the pressing ring 22 by correcting the deformation of the flange 11.

Further, in this embodiment, the deformation prevention member 40 includes the tapered portion 42 of which the dimension in the direction of the axis Ac gradually decreases from the outer radial side to the inner radial side. According to the above-described configuration, the deformation prevention member 40 can be disposed in the gap S of various sizes by adjusting the insertion amount of the tapered portion 42 with respect to the gap S according to the dimension of the gap S between the flange 11 and the pressing ring 22 in the direction of the axis Ac. Particularly, the thermal deformation of the flange 11 often occurs non-uniformly in the circumferential direction. According to the above-described configuration, even if such non-uniform thermal deformation occurs, the surface pressure of the gasket G can be uniformly secured by changing the insertion amount of the tapered portion 42.

Additionally, in this embodiment, the notch 22R which is recessed in the direction of the axis Ac and extends in the circumferential direction is formed in the outer radial region of the facing surface 22S. According to the above-described configuration, since the notch 22R is formed in the pressing ring 22, it is possible to more smoothly insert the deformation prevention member 40. Further, since the insertion amount of the deformation prevention member 40 can be increased compared to the case in which the notch 22R is not formed, it is also possible to reduce the possibility of the detachment of the deformation prevention member 40.

Furthermore, in this embodiment, the plurality of deformation prevention members 40 are provided at intervals in the circumferential direction. The wires W are inserted through the plurality of deformation prevention members 40. According to the above-described configuration, since the plurality of deformation prevention members 40 are provided at intervals in the circumferential direction, the distribution of the surface pressure of the gasket G in the circumferential direction can be made uniform. Further, since the plurality of deformation prevention members 40 are connected by the wire W, it is possible to suppress the detachment of the deformation prevention member 40. In addition, since the deformation prevention members 40 are also thermally connected to each other through the wire W, the distribution of the amount of heat input from the exhaust gas in the circumferential direction is smoothed. Accordingly, the amount of thermal expansion occurring in the pipe body 10 can be made uniform in the circumferential direction.

Further, in this embodiment, the deformation prevention member 40 is provided at a position that coincides with each coupling member 30 in the circumferential direction. According to the above described configuration, since the deformation prevention member 40 is provided at a position in which the tightening force of the coupling member 30 is concentrated, the deformation prevention member 40 can disperse the tightening force in the circumferential direction and the radial direction. Accordingly, it is possible to further reduce the possibility of the deformation of the flange 11.

The first embodiment of the present disclosure has been described above. Additionally, various changes and modifications can be made to each of the above configurations without departing from the gist of the present disclosure.

Figure 5:
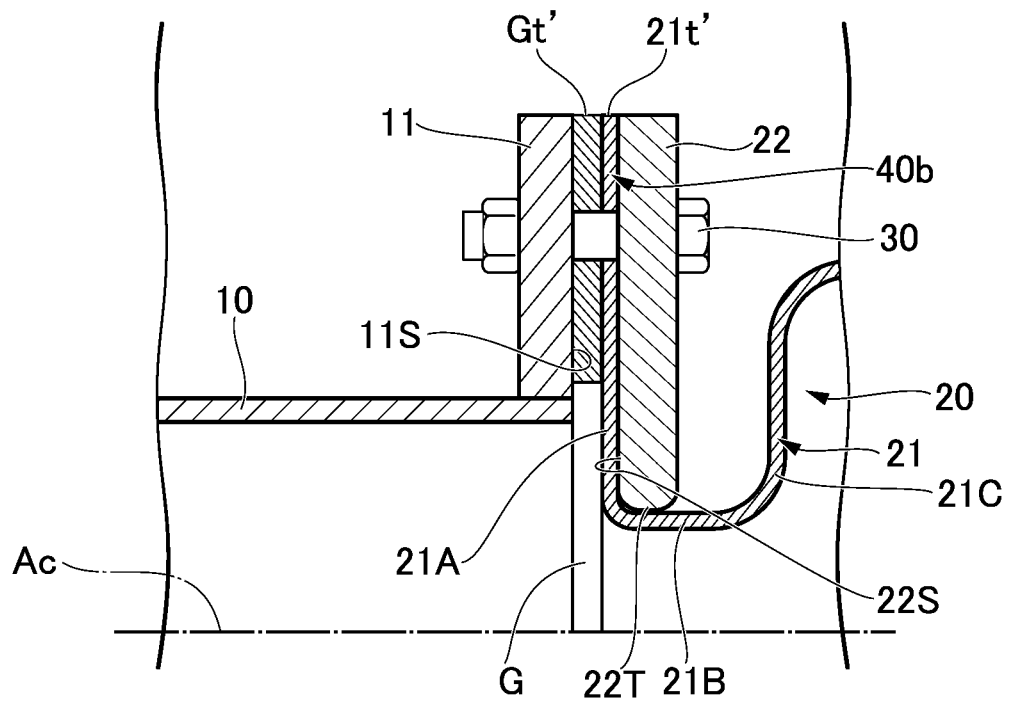
FIG. 5 is a main enlarged cross-sectional view showing a modified example of the exhaust gas pipe according to the first embodiment of the present disclosure.

For example, it is possible to adopt the configuration shown in FIG. 5 as a modified example. In the example shown in the same drawing, the outer peripheral edge (gasket edge (W) of the gasket G extends to the same position as the outer peripheral edge of the flange 11 in the radial direction. Further, the outer peripheral edge (collar edge 21t') of the collar 21A also extends to the same position as the outer peripheral edge of the flange 11 in the radial direction. That is, the gasket G and the collar 21A cover the entire surface of the flange facing surface 11S. Accordingly, the portion of the gasket G on the outer peripheral side of the coupling member 30 and the portion of the collar 21A on the outer peripheral side of the coupling member 30 constitute a deformation prevention member 40b.

According to the above-described configuration, the gasket, G covers the entire surface of the flange 11. Further, the outer radial portion (outer peripheral portion) of the gasket G functions as the deformation prevention member 40. Accordingly, it is possible to secure the surface pressure against the gasket G as in the first embodiment. Further, according to the above-described configuration, since part of the gasket G and the collar 21A constitute the deformation prevention member 40b, the number of parts is reduced and the cost required for manufacturing and maintaining the exhaust gas pipe 90 can be reduced.

Figure 6:
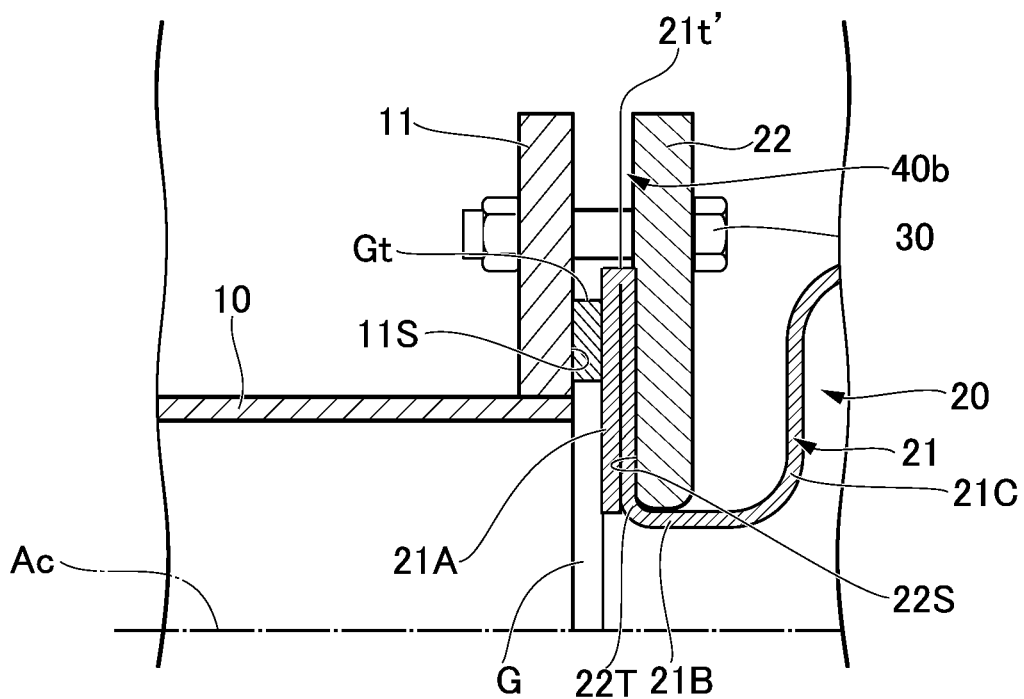
FIG. 6 is a main enlarged cross-sectional view showing another modified example of the exhaust gas pipe according to the first embodiment of the present disclosure.

Further, as a further modified example, it is also possible to adopt the configuration shown in FIG. 6. In the example of the same drawing, the gasket edge Gt is located on the inner peripheral edge of the coupling member 30. The collar edge 21t' is also located on the inner peripheral edge of the coupling member 30. Even with such a configuration, it is possible to obtain the same effects as those of the modified example according to FIG. 5. Additionally, in the example of FIG. 6, the collar edge 21t' is folded back in the radial direction. In addition, since it is not necessary to form a hole through which a bolt as the coupling member 30 is inserted in the gasket G, it is possible to further reduce the possibility of leakage of the exhaust gas through the hole.

Second Embodiment

Figure 7:
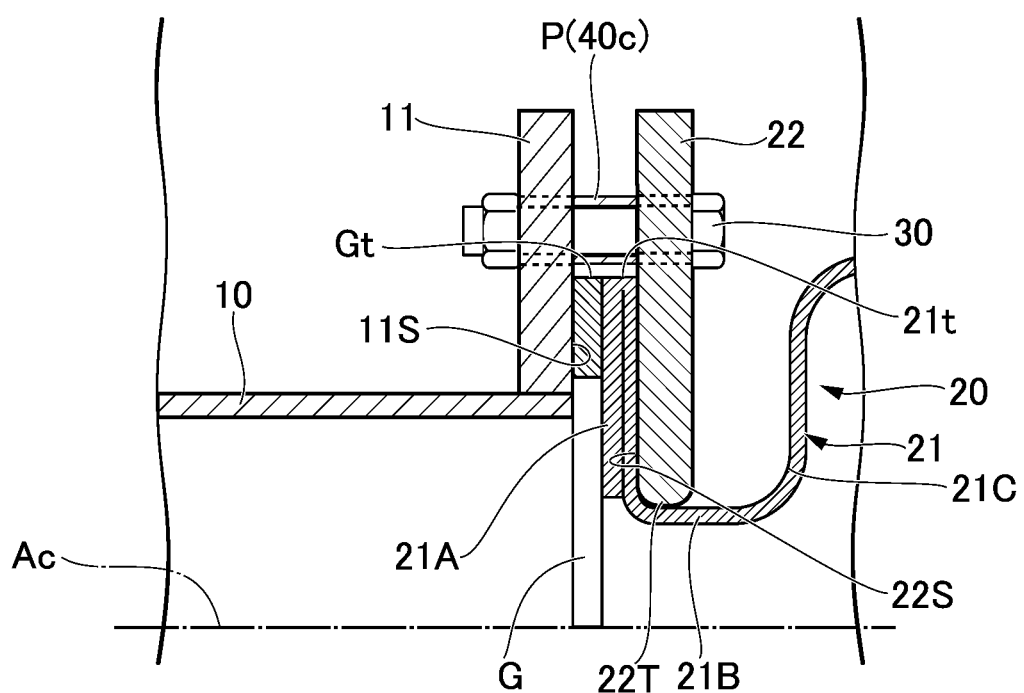
FIG. 7 is a main enlarged crass-sectional view showing an exhaust gas pipe according to a second embodiment of the present disclosure.

Next, a second embodiment of the present disclosure will be described with reference to FIG. 7. In addition, the same configurations as those of the first embodiment and the modified example thereof are denoted by the same reference numerals and detailed description is omitted.

In this embodiment, a pipe P is provided around a bolt as the coupling member 30 to cover the holt from the outer peripheral side. That is, the diameter of the insertion hole of the bolt formed in the flange 11 and the pressing ring 22 is larger than that of the first embodiment. Further, the pipe P extends in the direction of the axis Ac by the sum of the thicknesses of the flange 11, the gasket G, the collar 21A, and the pressing ring 22. Additionally, this sum is a value determined in advance at the time of design and is a value when the above-described thermal deformation does not occur in the flange 11. The pipe P constitutes a deformation prevention member 40c.

According to the above-described configuration, when the bolt is tightened, the tightening amount of the bolt is limited by the pipe P as a deformation prevention member 40c. Specifically, the pipe P extends by the sum of the thicknesses of the flange 11, the gasket G, the collar 21A, and the pressing ring 22. The rigidity of the pipe P in the direction of the axis Ac prevents the bolt from being tightened beyond the total thickness. Thus, excessive bolt tightening is avoided, and deformation of the flange 11 can be prevented. As a result, it is possible to secure the surface pressure against the gasket G.

As described above, each embodiment of the present disclosure has been described. Additionally, various changes and modifications can be made to each of the above configurations without departing from the gist of the present disclosure. For example, in the above-described embodiments, the configuration of the exhaust gas pipe 90 has been described with the marine engine 100 taken as an example. However, the application of the exhaust gas pipe 90 is not limited to marine engine, and the exhaust gas pipe 90 can also be applied to other engines such as transportation machinery and power generation equipment.

Further, in the above-described embodiments, an example in which twelve bolts and nuts as the coupling members 30 are arranged in the circumferential direction has been described. However, the number of bolts and nuts is not limited to twelve, and can be changed as appropriate according to design and specifications.

Further, in the above-described embodiments, the example in which the gasket G is made of SUS has been described. However, the material of the gasket G is not limited to SUS, and the gasket G can be also made of heat-resistant resin or ceramics.

Further, the deformation prevention members 40, 40b, and 40c described in each of the above-described embodiments and their modified examples can be applied in combination thereof.

APPENDIX

The exhaust gas pipe 90 and the engine 100 described in each embodiment is understood, for example, as below.

(1) The exhaust gas pipe 90 according to a first aspect includes: the plurality of pipe bodies 10 which are formed in a tubular shape centered on the axis Ac and are arranged in the direction of the axis Ac and through which an exhaust gas led from the engine body 1 flows; the connection portion 20 connecting the pair of pipe bodies 10 adjacent to each other in the direction of the axis Ac; and the gasket G which is provided between the pipe body 10 and the connection portion 20, wherein the flange 11 projecting toward the outer peripheral side is provided at an end portion of the pipe body 10 in the direction of the axis Ac, wherein the connection portion 20 includes the main connection body 21 which has a tubular shape centered on the axis Ac and the pressing ring 22 which is provided with the facing surface 22S facing the flange 11 while sandwiching, the gasket G in the gap S between the flange 11 and the facing surface, and wherein the exhaust gas pipe further includes: the coupling members 30 which are provided at intervals in the circumferential direction and coupling the flange 11 and the pressing ring 22 to each other; and the deformation prevention member 40 which is provided in the outer peripheral region of the gap S.

According to the above-described configuration, the deformation prevention member 40 is provided in the outer peripheral region of the gap S formed between the flange 11 and the pressing ring 22. Accordingly, for example, even when the flange 11 is deformed and inclined in the direction of the axis Ac, it is possible to secure the surface pressure against the gasket G between the flange 11 and the pressing ring 22 by sandwiching the deformation prevention member 40.

(2) In the exhaust gas pipe 90 according to a second aspect, the deformation prevention member 40 may include the tapered portion 42 of which a length along the axis Ac gradually decreases from the outer radial side to the inner radial side.

According to the above-described configuration, the deformation prevention member 40 can be disposed in the gap S of various sizes by adjusting the insertion amount of the tapered portion 42 with respect to the gap S according to the length of the gap S between the flange 11 and the pressing ring 22 along the axis Ac.

(3) In the exhaust gas pipe 90 according to a third aspect, the notch 22R which is recessed in the direction of the axis Ac and extends in the circumferential direction may be formed on the outer radial region of the facing surface 22S.

According to the above-described configuration, since the notch 22R is formed in the pressing ring 22, it is possible to more smoothly insert the deformation prevention member 40.

(4) In the exhaust gas pipe 90 according to a fourth aspect, the plurality of deformation prevention members 40 may be provided at intervals in the circumferential direction and the exhaust gas pipe may further include the wire W connecting the plurality of deformation prevention members 40.

(5) According to the above-described configuration, since the plurality of deformation prevention members 40 are provided at intervals in the circumferential direction, the distribution of the surface pressure in the circumferential direction can be made uniform. Further, since the plurality of deformation prevention members 40 are connected by the wire W, it is possible to suppress the detachment of the deformation prevention member 40. Further, since the deformation prevention members 40 are also thermally connected to each other through the wire W, the distribution of the amount of heat input from the exhaust gas in the circumferential direction is smoothed. Accordingly, the amount of thermal expansion occurring in the pipe body 10 can be made uniform in the circumferential direction.

(5) In the exhaust gas pipe 90 according to a fifth aspect, the deformation prevention member 40 may be provided at a position that coincides with each coupling member 30 in the circumferential direction.

According to the above-described configuration, since the deformation prevention member 40 is provided at a position in which the tightening force of the coupling member 30 is concentrated, the deformation prevention member 40 can disperse the tightening force. Accordingly, it is possible to further reduce the possibility of the deformation of the flange 11.

(6) In the exhaust gas pipe 90 according to a sixth aspect, the gasket G may be formed in an annular shape that covers the entire surface of the flange 11 and an annular portion on the outer radial side of the gasket G may constitute the deformation prevention member 40b.

According to the above-described configuration, the gasket G covers the entire surface of the flange 11. Further, the outer radial portion of the gasket G functions as the deformation prevention member 40b. Accordingly, the number of parts is reduced and the cost required for manufacturing and maintaining the exhaust gas pipe 90 can be reduced.

(7) In the exhaust gas pipe 90 according to a seventh aspect, the connection portion 20 may include the elastic portion 21C which can be expanded and contracted in the direction of the axis Ac and the collar 21A which is provided at the end portion of the elastic portion 21C and projects toward the outer peripheral side and an annular portion on the outer radial side of the collar 21A may constitute the deformation prevention member 40b.

According to the above-described configuration, the outer radial portion of the collar 21A functions as the deformation prevention member 40b. Accordingly, the number of parts is reduced and the cost required for manufacturing and maintaining the exhaust gas pipe 90 can be reduced.

(8) In the exhaust gas pipe 90 according to an eighth aspect, the through-hole which extends in the direction of the axis Ac may be formed in each of the flange 11 and the pressing ring 22, the coupling member 30 may include a bolt inserted through the through-hole and a nut fastened to the bolt, and the deformation prevention member 40c may be a pipe P which is inserted through the through-hole, covers the bolt from the outer peripheral side and is extended in the direction of the axis Ac by a predetermined amount.

According to the above-described configuration, when the bolt is tightened, the tightening amount of the bolt is limited by the pipe P. Accordingly, excessive bolt tightening is avoided, and deformation of the flange 11 can be prevented.

(9) The engine 100 accenting to a ninth aspect includes: the exhaust gas pipe 90 and the engine body 1 which is provided with the combustion chamber 2 from which the exhaust gas is sent to the exhaust gas pipe 90.

According to the above-described configuration, it is possible to provide the engine 100 provided with the exhaust gas pipe 90 in which leakage of an exhaust gas is further reduced.

INDUSTRIAL APPLICABILITY

According to the present disclosure, it is possible to provide an exhaust gas pipe and an engine in which leakage of an exhaust gas is further reduced.

REFERENCE SIGNS LIST

100 Engine
90 Exhaust gas pipe
1 Engine body
2 Combustion chamber
2A Branch pipe
10 Pipe body
11 Flange
11S Flange facing surface
20 Connection portion
21 Main connection body
21A Collar
21B Parallel portion
21C Elastic portion
21*t*, 21*t'* Collar edge
22 Pressing ring
22R Notch
22S Facing surface
22T Ring inner peripheral edge 30 Coupling member
40, 40b, 40c Deformation prevention member
41 Base portion
42 Tapered portion
42S Tapered surface
Ac Axis
G Gasket
Gt, Gt' Gasket edge
h Through-hole
P Pipe
W Wire

What is claimed is:

1. An exhaust gas pipe comprising:
a plurality of pipe bodies which are formed in a tubular shape centered on an axis and are arranged in a direction of the axis and through which an exhaust gas led from an engine body flows;
a connection portion connecting a pair of the pipe bodies adjacent to each other in the direction of the axis; and
a gasket which is provided between the pipe body and the connection portion,
wherein a flange projecting toward an outer peripheral side is provided at an end portion of the pipe body in the direction of the axis,
wherein the connection portion includes a main connection body which has a tubular shape centered on the axis and a pressing ring which is provided with a facing surface facing the flange while sandwiching the gasket in a gap between the flange and the facing surface, and
wherein the exhaust gas pipe further comprises:
coupling members which are provided at intervals in a circumferential direction and coupling the flange and the pressing ring to each other; and
a deformation prevention member that is provided in an outer peripheral region of the gap,
wherein the deformation prevention member includes a tapered portion of which an axial dimension gradually decreases from an outer radial side to an inner radial side,
wherein a plurality of the deformation prevention members are provided at intervals in the circumferential direction, and
wherein the exhaust gas pipe further comprises a wire connecting the plurality of deformation prevention members.

2. The exhaust gas pipe according to claim 1, wherein a notch which is recessed in the direction of the axis and extends in the circumferential direction is formed on an outer radial region of the facing surface.

3. The exhaust gas pipe according to claim 1, wherein the deformation prevention member is provided at a position that coincides with each coupling member in the circumferential direction.

4. The exhaust gas pipe according to claim 1, wherein the gasket is formed in an annular shape that covers an entire surface of the flange and an annular portion on the outer radial side of the gasket constitutes the deformation prevention member.

5. The exhaust gas pipe according to claim 1, wherein the connection portion includes an elastic portion which is able to be expanded and contracted in the direction of the axis and a collar which is provided at an end portion of the elastic portion and projects toward an outer peripheral side, and
wherein an annular portion on the outer radial side of the collar constitutes the deformation prevention member.

6. The exhaust gas pipe according to claim 1, wherein a through-hole which extends in the direction of the axis is formed in each of the flange and the pressing ring,
wherein the coupling member includes a bolt inserted through the through-hole and a nut fastened to the bolt, and
wherein the deformation prevention member is a pipe which is inserted through the through-hole, covers the bolt from the outer peripheral side and is extended in the direction of the axis by a predetermined amount.

7. An engine comprising:
the exhaust gas pipe according to claim 1; and
an engine body which is provided with a combustion chamber from which an exhaust gas is sent to the exhaust gas pipe.

* * * * *